(12) United States Patent
Yokokawa et al.

(10) Patent No.: US 6,229,944 B1
(45) Date of Patent: May 8, 2001

(54) OPTICAL FIBER CABLE

(75) Inventors: Tomoyuki Yokokawa; Yoshiyuki Suetsugu, both of Kanagawa; Hideyuki Iwata, Ibaraki, all of (JP)

(73) Assignees: Sumitomo Electric Industries, Ltd., Osaka; Nippon Telegraph and Telephone Corporation, Tokyo, both of (JP)

( * ) Notice: Subject to any disclaimer, the term of this patent is extended or adjusted under 35 U.S.C. 154(b) by 0 days.

(21) Appl. No.: 09/338,580

(22) Filed: Jun. 23, 1999

(51) Int. Cl.$^7$ ...................................................... G02B 6/44
(52) U.S. Cl. ............................ 385/114; 385/112; 385/113
(58) Field of Search ....................................... 385/100–114

(56) References Cited

U.S. PATENT DOCUMENTS 5,249,249 * 9/1993 Eoll et al. .............................. 385/114
5,369,720 * 11/1994 Parry et al. ........................... 385/114
5,978,537 * 11/1999 Hosoi et al. .......................... 385/112

FOREIGN PATENT DOCUMENTS 8-278432   10/1996   (JP) .

* cited by examiner

Primary Examiner—Hemang Sanghavi
(74) Attorney, Agent, or Firm—McDermott, Will & Emery (57) ABSTRACT

An optical fiber cable in which optical fiber ribbon stack can be accommodated in a cylindrical space efficiently and which has excellent loss characteristic. A plurality of optical fiber ribbons 1 are stacked. Cushioning fillers 2 are disposed around the optical fiber ribbon stack 1. The optical fiber ribbon stack 1 and the cushioning fillers 2 are accommodated in a cylindrical member 3. The space factor of the cushioning fillers in the inner space of the cylindrical member as a remainder after removal of the optical fiber ribbon stack from the inner space is from 10 to 60%. Consequently, the optical fiber cable becomes excellent both in initial transmission loss and in loss increasing characteristic at a low temperature.

11 Claims, 5 Drawing Sheets

THE RELATION BETWEEN THE NUMBER OF CORES PER OPTICAL FIBER RIBBON AND THE AMOUNT OF INCREASE OF LOSS AT LOW TEMPERATURE

FIG.9

THE RELATION BETWEEN THE SIZE OF BENDING OF THE CABLE AND THE AMOUNT OF INCREASE OF LOSS AT LOW TEMPERATURE

OPTICAL FIBER CABLE

BACKGROUND OF THE INVENTION

1. Field of the Invention

The present invention relates to an optical fiber cable having a structure in which optical fiber ribbon stack are accommodated in a cylindrical space.

2. Related Art of the Invention

As an method for achieving a multi-core optical fiber cable, optical fiber ribbon stack each having coated optical fibers (hereinafter sometimes simply referred to as"core") aligned and coated so as to be shaped like a tape are used. A multi-core optical fiber cable can be formed easily by stack of the optical fiber ribbon. When the optical fiber ribbons are stacked simply, however, external force is apt to act on the optical fiber cable so that micro-bending loss increases. As a countermeasure, for example, a structure in which a plurality of optical fiber ribbons are accommodated in a metallic tube is employed in an optical fiber cable disclosed in JP-A-8-278432.

It may be, therefore, thought of that the cylindrical space is enlarged and the amount of the cushioning fillers between the optical fiber ribbons and the metallic cylinder is reduced. However, if the amount of the cushioning fillers is too small, the optical fiber ribbon stack hit against the inner wall of the metallic cylinder when bending force acts on the optical cable. As a result, the optical fiber ribbons are broken or bent precipitously, so that transmission loss increases because of leakage of light.

On the other hand, the linear expansion coefficient of the optical fiber ribbon is smaller than that of the cushioning fillers around the optical fiber ribbons. Accordingly, at a low temperature, the outer tube shrinks more greatly than the optical fiber ribbons, so that the optical fiber ribbons are deformed. However, if the amount of the cushioning fillers around the optical fiber ribbons is too large, there occurs another problem that a limitless number of bends with small radii of curvature are generated, so that transmission loss increases because of leakage of light.

The background-art type structure in which only the optical fiber ribbons are directly accommodated in a cylindrical space, however, has a problem that transmission loss is apt to increase because coated optical fibers located in end portions of the optical fiber ribbons suffer side pressure from the inner wall of the metallic cylinder. Accordingly, there arises a problem on design of the optical fiber cable that a countermeasure to widen the cylindrical space, a countermeasure to limit the number of coated optical fibers (hereinafter simply referred to as "cores" in each of optical fiber ribbon stack or the member of optical fiber ribbon stack accommodated in the cylindrical space, etc. are required to prevent the side pressure from acting on the optical fiber ribbon stack.

SUMMARY OF THE INVENTION

An object of the present invention is therefore to provide an optical fiber cable in which optical fiber ribbon stack are accommodated in a cylindrical space efficiently and which has excellent loss characteristic.

In order to achieve the above object, according to an aspect of the present invention, provided is an optical fiber cable comprising optical fiber ribbon stack, cushioning fillers disposed around the stack, and a cylindrical space for accommodating the stack and the fillers, wherein the space factor of the cushioning fillers in the cylindrical space is set to be in a range of from 10% to 60%, the space factor being defined as a ratio of a sectional area occupied by the fillers in the cylindrical space to a sectional area of the cylindrical space excluding the whole of the optical fiber ribbon stack.

Preferably, in the above optical fiber cable, the optical fiber ribbon stack are constituted by a combination of one type of or different types of coated optical fibers each of which contains coated optical fibers in a range of 4 to 36 in number.

Preferably, in the above optical fiber cable, the cylindrical space is formed by a molding of a plastic material extruded on an outer circumference of the cushioning fillers.

Preferably, in the above optical fiber cable, the cylindrical space is constituted by a metallic tube formed on an outer circumference of the cushioning fillers.

It is therefore an object of the present invention not only to fulfil a sufficient cushioning function to thereby prevent breaking or precipitous bending of optical fiber ribbon stack due to collision of the optical fiber ribbon stack with the inner wall of an outer tube such as a metallic or plastic cylinder when bending force acts on the outer tube, but also to lead the optical fiber ribbon stack to make the surplus length of the optical fiber ribbon stack curved gently, that is, curved with a large radius of curvature to thereby prevent the increase of transmission loss due to leakage of light when cushioning fillers shrink at a low temperature.

According to a first aspect, provided is an optical fiber cable comprising optical fiber ribbon stack successively stacked, fiber-like cushioning fillers made of stack of strings or yarns and disposed so as to surround the coated optical fiber ribbon stack, and an outer tube forming a cylindrical inner space so as to surround the cushioning fillers, wherein a space factor S of the cushioning fillers in a remaining space after removal of the optical fiber ribbon stack from the inner space of the outer tube is set to be in a range of from 10 to 60% when the space factor S is given by the following expression:

$$S=\{B/(\pi r^2-A)\}\times 100$$

in which A is a total sectional area of the optical fiber ribbon stack, and B is a total sectional area of cushion fillers and given by the following expression:

$$B=(\text{denier value}\times\text{total number})/900000\times \text{ specific gravity of the cushioning fillers.}$$

In such a configuration, it becomes possible to provide a highly reliable optical fiber cable which is very low both in initial loss and in transmission loss at a low temperature. If the space factor is smaller than 10%, the cushioning effect of the cushioning fillers cannot be fulfilled sufficiently, and as a result, the optical fiber cable becomes weak against bending force, so that transmission loss due to the bending of the optical fiber cable, that is, initial loss increases. If the space factor is contrariwise larger than 60%, the optical fiber ribbon stack cannot be led to make the surplus length of the optical fiber ribbon stack curved gently, that is, curved with a large radius of curvature when the cushioning fillers shrink at a low temperature, and as a result, a limitless number of curves with small radii of curvature are generated to thereby increase the transmission loss due to leakage of light.

According to a second aspect, in the optical fiber cable defined in the First aspect, the space factor of the cushioning fillers is set to be in a range of from 10 to 50%.

In such a configuration, the transmission loss at a low temperature can be reduced securely.

According to a third aspect, in the optical fiber cable defined in the first aspect, the cushioning fillers are provided so as to be stranded around the optical fiber ribbon stack.

That is, stack of strings or yarns used as the cushioning fillers are stranded around the optical fiber ribbon stack, so that the cushioning effect is fulfilled more securely to reduce initial loss even in the case where the space factor is small. On the other hand, even at a low temperature, the optical fiber ribbon stack can be led to be curved gently due to the stranding of the cushioning fillers, so that low-temperature loss can be also reduced. Furthermore, because of use of a stranding method, such as an S-stranding method in which the cushioning fillers are stranded so as to be S-shaped, a Z-stranding method in which the cushioning fillers are stranded so as to be Z-shaped, an SZ-stranding method in which S-stranding and Z-stranding are alternately repeated, or the like, force acts only to unstrand the cushioning fillers when the cushioning fillers shrink, so that side pressure is little applied to the optical fiber ribbon stack in the inside of the cushioning fillers. Accordingly, low-temperature loss is reduced greatly.

According to a fourth aspect, in the optical fiber cable defined in the third aspect, the cushioning fillers are provided so as to be stranded in one and inverted directions alternately around the optical fiber ribbon stack.

In such a configuration, in addition to the aforementioned effect, there is an effect that the cushioning fillers can be separated without wound up on the optical fiber ribbon stack when the optical fiber ribbon stack are taken out at the time of midspan entry work or at the time of terminal connecting work.

According to a fifth aspect, in the optical fiber cable defined in the first aspect, the number of optical fiber of each of the optical fiber ribbon is in a range of from 4 to 36 both inclusively.

Figure 8:
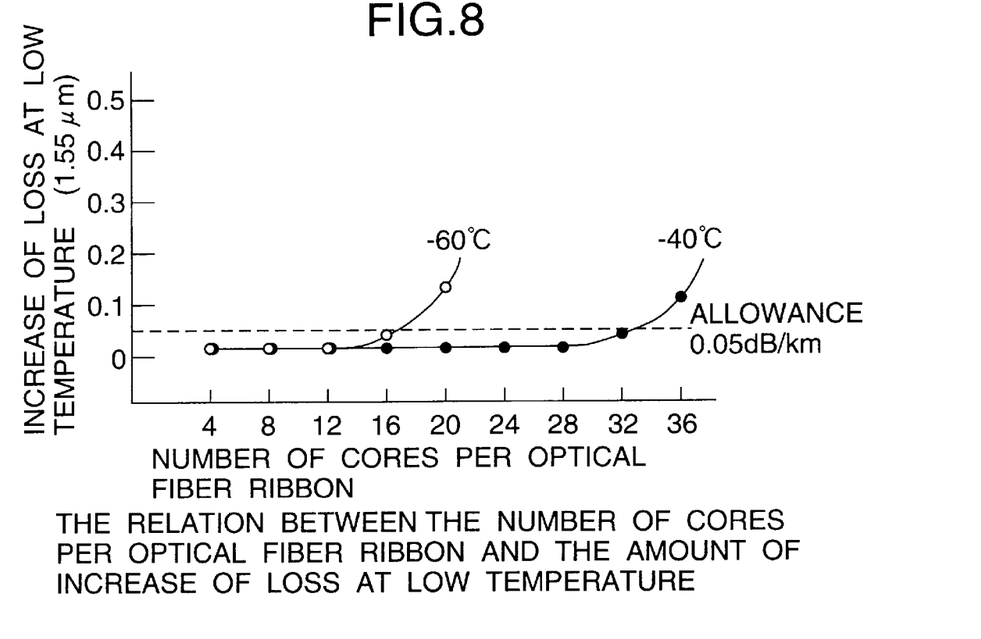
FIG. 8 is a graph showing a result of measurement of the relation between the number of cores per optical fiber ribbon bundle and the amount of increase of loss at a low temperature.

In such a configuration, the increase of loss can be suppressed at a lower temperature down to −40° C. (see FIG. 8).

According to a sixth aspect, in the optical fiber cable defined in the first aspect, the number of optical fiber of each of the optical fiber ribbon is in a range of from 4 to 12 both inclusively.

In such a configuration, the increase of loss can be suppressed at a lower temperature down to −60° C. (see FIG. 8).

According to a seventh aspect, in the optical fiber cable defined in the first aspect, the outer tube is constituted by a plastic tube formed by extrusion molding.

The plastic tube formed by extrusion molding has a problem that the factor of shrinkage thereof is so large that the plastic tube suffers low-temperature loss easily. In the aforementioned configuration, however, the low-temperature loss can be suppressed. Furthermore, when the cushioning fillers are selected, the plastic tube can be thermally fusion-bonded to surfaces of the cushioning fillers by extrusion heat at the time of production of the optical fiber cable to thereby prevent the fillers and the optical fiber ribbon stack inside the fillers from moving in the longitudinal direction of the optical fiber cable.

According to an eighth aspect, in the optical fiber cable defined in the first aspect, the outer tube is constituted by a metallic tube.

In such a configuration, the deformation of the outer tube due to side pressure from the outside of the cable can be suppressed, so that the cushioning characteristic of the cushioning fillers inside the outer tube can be brought out more conspicuously.

According to a ninth aspect, in the optical fiber cable defined in the first aspect, the cushioning fillers have water absorption properties.

According to a tenth aspect, in the optical fiber cable defined in the first aspect, the space factor S is set to be in a range of from 20 to 40%.

Figure 2:
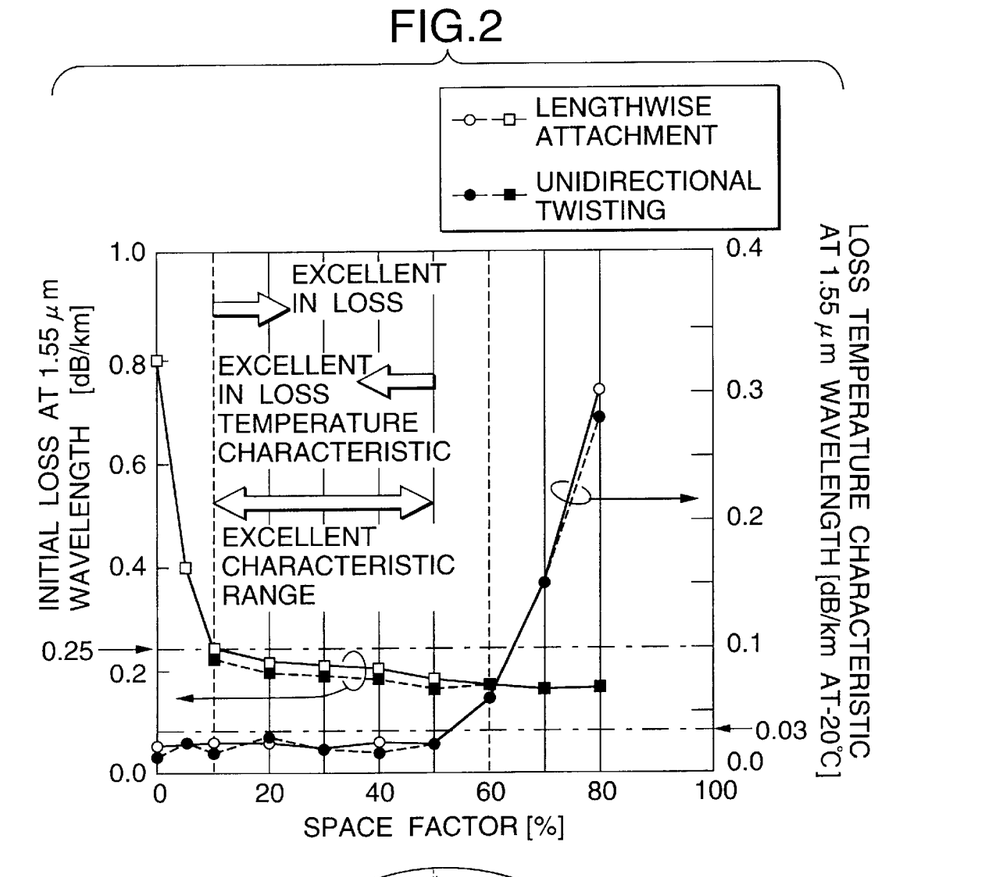
FIG. 2 is a graph showing measured results in experimental samples.
Figure 9:
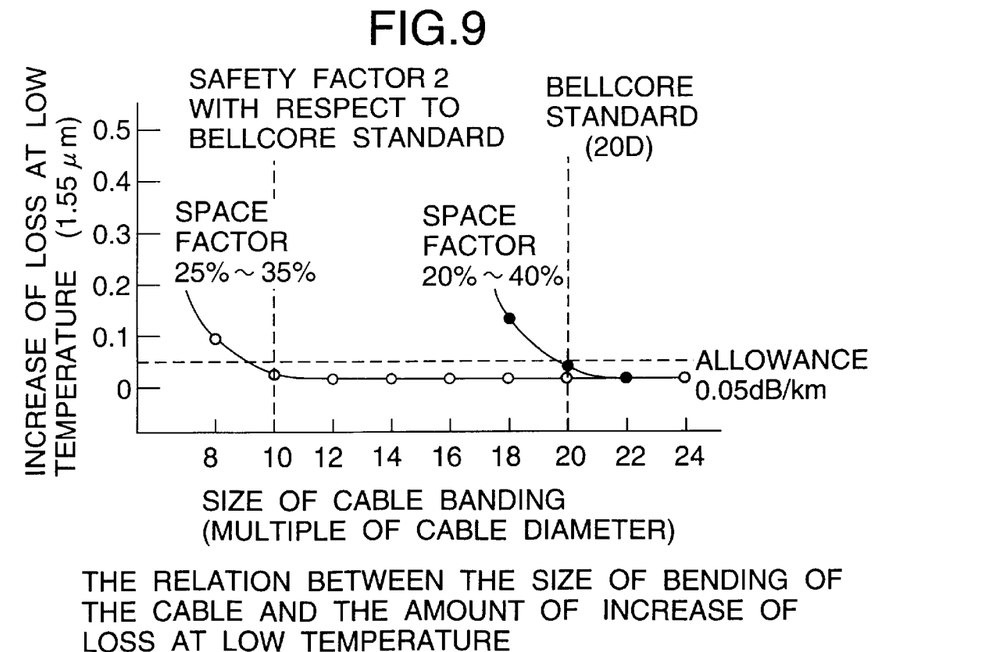
FIG. 9 is a graph showing a result of measurement of the relation between the size of bending of the cable and the amount of increase of loss at a low temperature.

In such a configuration, as shown in FIG. 2, the low-temperature loss can be suppressed against the size of bending of the cable up to 20 times (Bellcore Standard GR-20) as large as the diameter of the cable (see FIG. 9).

According to an eleventh aspect, in the optical fiber cable defined in the first aspect, the space factor S is set to be in a range of from 25 to 35%.

In such a configuration, as shown in FIG. 2, the low-temperature loss can be suppressed against the size of bending of the cable up to 10 times (safety factor of 2 with respect to Bellcore Standard GR-20) as large as the diameter of the cable (see FIG. 9).

DESCRIPTION OF THE PREFERRED EMBODIMENTS

First, the outline of an optical fiber cable according to the present invention will be described. The basic configuration of the optical fiber cable is as follows. A plurality of optical fiber ribbon are stacked. Cushioning fillers are disposed around the optical fiber ribbon stack so that the cushioning fillers have a suitable space factor. The optical fiber ribbon stack and the cushioning fillers are accommodated in a cylindrical space formed in the inside of a cylindrical member made of a metal, plastics, or the like. The cylindrical member containing the optical fiber ribbon stack in the aforementioned manner may be provided as an envelope to thereby form an optical fiber cable. Alternatively, an envelope provided separately may be applied onto the cylindrical member to thereby form an optical fiber cable. Further, such a cylindrical member containing the optical fiber ribbon stack therein in the aforementioned manner may be used as a cable-constituent element of an optical fiber cable, and a plurality of such cable-constituent elements are collected with an envelope applied onto the collected cable-constituent elements to thereby form an optical fiber cable.

In this specification, such a cable-constituent element is also referred to as an optical fiber cable.

The space factor of the cushioning fillers disposed around the optical fiber ribbon stack in the cylindrical space is defined as follows. Assuming now that the inner sectional area of the cylindrical member, the total sectional area of the optical fiber ribbon stack and the total sectional area of the cushioning fillers are s, A and B respectively. Then, the space factor S (%) is expressed by the following formula:

$$S=(B/(s-A))\times 100$$

in which the condition $s=\pi r^2$ is established when the inner diameter of the cylindrical member is 2r on the assumption that the cylindrical member has a perfect cylindrical shape. When a fibrous material having a thickness expressed in denier is used as the cushioning fillers, the total sectional area B (cm²) of the cushioning fillers is expressed by the following formula:

$$B=(\text{denier number}\times\text{total amount of cushioning fillers})/(900000\times\text{gravity of cushioning fillers})$$

The relation between the space factor of the cushioning fillers and the characteristic of the optical fiber cable has been discussed. As a result, the following facts have been found.

(1) The cushioning fillers serve as an elastic buffer layer between the optical fiber ribbon stack and the inner wall of the cylindrical member. When transmission loss at room temperature is taken into account, the space factor is preferably set to be larger. Specifically, the space factor is preferably set to be equal to or larger than 10%.

(2) A metal or plastics as a constituent material of the cylindrical member shrinks at a low temperature. When the optical fiber ribbon stack are bent in the direction of width in the low temperature condition, transmission loss increases. To suppress the increase of transmission loss, the space factor is required to be made equal to or smaller than 60% so that the space in which the optical fiber ribbon stack can move is secured sufficiently.

As a result of the aforementioned consideration, when the cushioning fillers are disposed around the optical fiber ribbon stack so that the space factor of the cushioning fillers is selected to be in a range of from 10 to 60%, an optical fiber cable excellent both in initial loss and in loss temperature characteristic can be provided.

Incidentally, the optical fiber ribbon stack may be loosely accommodated in the cylindrical space so as to be able to move more or less zigzagly.

Figure 1:
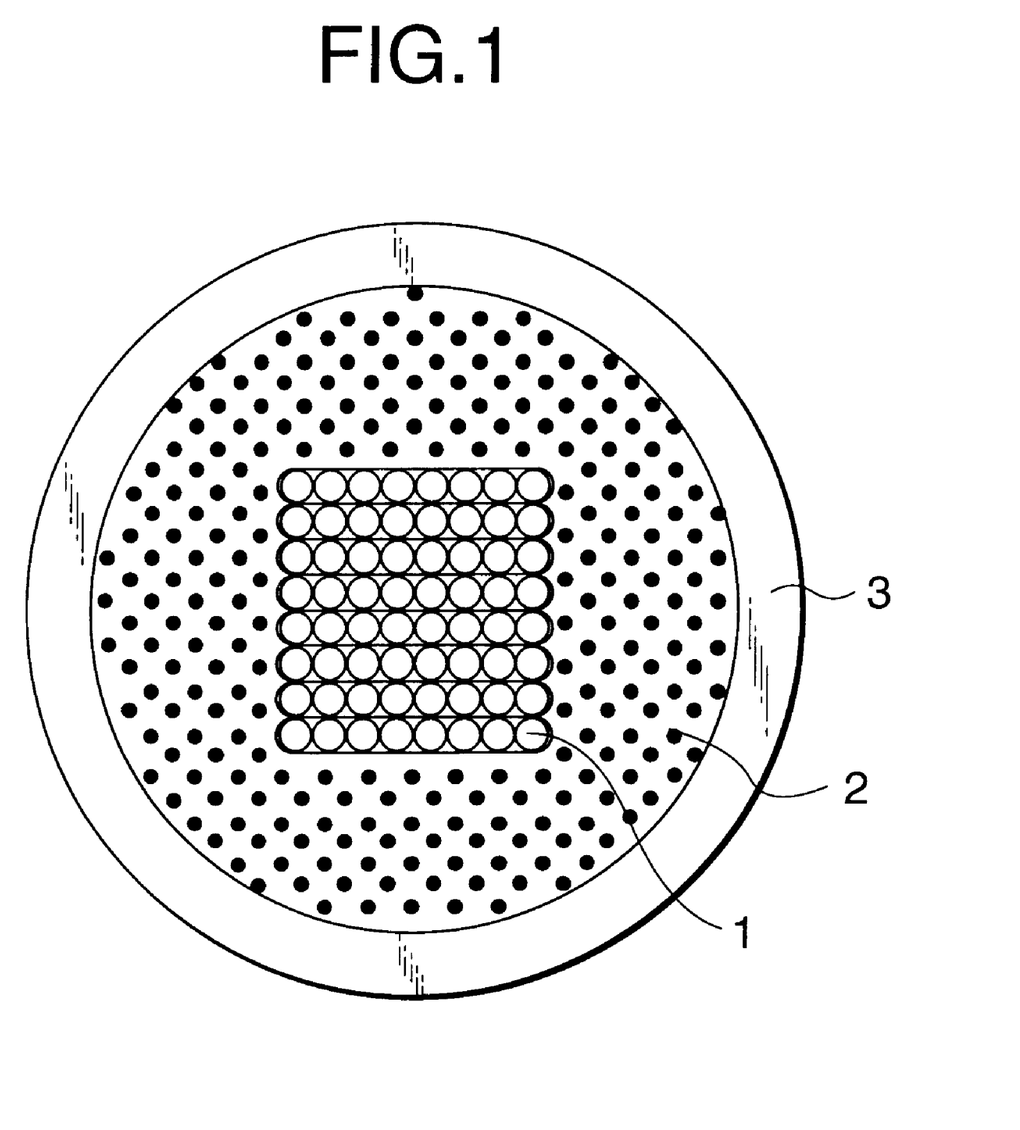
FIG. 1 is a sectional view showing an optical fiber cable as a first embodiment of the present invention.

Now, an embodiment of the present invention is described below. FIG. 1 is a sectional view showing an optical fiber cable as a first embodiment of the present invention. In FIG. 1, the reference numeral 1 designates a optical fiber ribbon stack; 2, a cushioning filler; and 3, a cylindrical member. A plurality of optical fiber ribbon stack 1 are stacked. The cushioning fillers 2 are disposed around the optical fiber ribbon stack 1. The optical fiber ribbon stack 1 and the cushioning fillers 2 are accommodated in the cylindrical member 3.

Experimental samples based on this embodiment were produced as follows. Eight optical fiber ribbon stack each having eight 8-fiber ribbons having a thickness of 0.3 mm and a width of 2.1 mm were stacked to form a 64-core optical fiber cable as the optical fiber ribbon stack 1 include. A plastic tube having an external diameter of 6 mm and an inner diameter of 4.8 mm was used as the cylindrical member 3. Polypylene yarns were used as the cushioning fillers 2. Optical fiber cable samples diversified in the space factor of the cushioning fillers 2 within a range of from 0 to 80% were produced. In trial manufacture, two kinds of samples were produced in which the polypylen yarns were longitudinally extend along the optical fiber ribbon stack 1 and the polypylen yarns were stranded around the optical fiber ribbon stack 1 in one direction. The optical fiber cable samples different in the space factor of the cushioning fillers 2 were evaluated about transmission loss and loss temperature characteristic at a wavelength of 1.55 µm. As the loss temperature characteristic, low-temperature characteristic was measured. In the measurement condition of −40° C., increase of loss was observed.

Results of the measurement are shown in FIG. 2. When the space factor of the cushioning fillers was equal to or larger than 10%, transmission loss of a good level equal to or lower than 0.25 dB/km was obtained. On the other hand, good low-temperature characteristic was exhibited under the condition that increase of loss at −40° C. became equal to or smaller than 0.05 dB/km indicating measurement accuracy when the space factor of the cushioning fillers was equal to or smaller than 60%.

Also from the results, it was confirmed that both the initial transmission loss and low-temperature loss increasing characteristic could be made excellent when the space factor of the cushioning fillers was set to be in a range of from 10 to 60%.

Other optical fiber cable samples based on this embodiment were produced and evaluated as follows. That is, two kinds of optical fiber cable samples, namely, one kind having an outer diameter of 5.0 mm and an inner diameter of 3.8 mm and the other kind having an outer diameter of 6.5 mm and an inner diameter of 5.3 mm, were produced and evaluated. It was confirmed that both the initial transmission loss and low-temperature loss increasing characteristic could be made excellent when the space factor of the cushioning fillers was set to be in a range of from 10 to 60% in the same manner as in the previously-described samples each having an outer diameter of 6.0 mm and an inner diameter of 4.8 mm.

As described above, according to the present invention, barometers of forming an optical fiber cable having a small diameter are obtained so as to be effective for reduction of the cost of production, carrying and custody.

Figure 3:
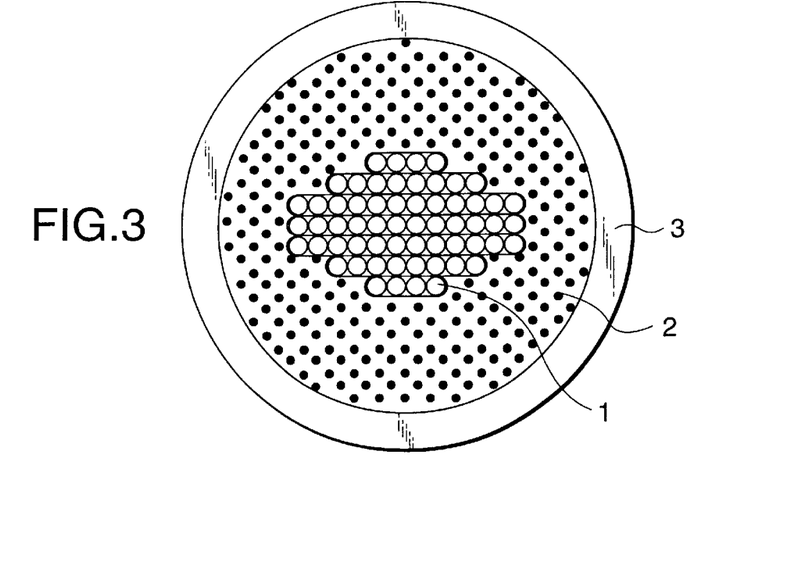
FIG. 3 is a sectional view showing an optical fiber cable as a second embodiment of the present invention.

FIG. 3 is a sectional view of an optical fiber cable as a second embodiment of the present invention. In FIG. 3, parts the same as those in FIG. 1 are referenced correspondingly and the description of the parts will be omitted. In this embodiment, optical fiber ribbon stack different in the number of coated optical fibers or cores contained therein were used in combination as the optical fiber ribbon to be stacked. In a specific example, three 12-fiber ribbons stack were stacked in the center, two 8-fiber ribbons stack were stacked on the opposite outsides of the three center stack, and two 4-fiber ribbons stack were stacked on the opposite outsides of the two outer stack. In total, the stack had 60 fibers.

Also in such an optical fiber cable in which optical fiber ribbon stack different in the number of cores were used in combination as described above, it was confirmed that both the initial transmission loss and low-temperature loss increasing characteristic could be made excellent when the space factor of the cushioning fillers 2 was set to be in a range of from 10 to 60%.

Figure 4A:
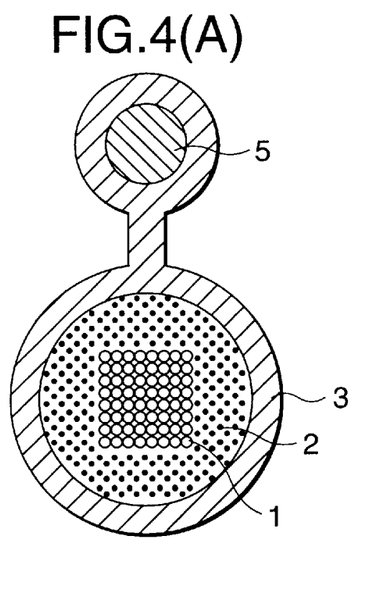
FIGS. 4A and 4B are sectional views each showing an optical fiber cable as a third embodiment of the present invention.
Figure 4B:
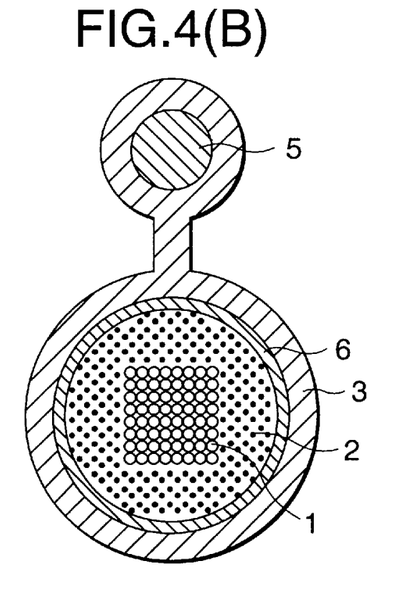

FIGS. 4A and 4B are sectional views each showing an optical fiber cable as a third embodiment of the present invention. In FIGS. 4A and 4B, parts the same as those in FIG. 1 are referenced correspondingly and the description of the parts will be omitted. In FIGS. 4A and 4B, the reference numeral 4 designates a sheath; 5, a tension member; and 6, a plastic tube. In this embodiment, the present invention is applied to a self-support type optical fiber cable. The tension member 5 is laid as a support wire.

The optical fiber cable in FIG. 4A shows an example in which the sheath 4 for connecting the cable core portion and the tension member to each other is used also as the cylindrical member of the cable core portion. The sheath 4 is formed by extrusion coating of plastic material. The space factor of the cushioning fillers 2 is set to be in a range of from 10 to 60% as described above.

The optical fiber cable in FIG. 4B shows an example in which a two-layer structure of the plastic tube 6 and the sheath 4 is used as the cylindrical member. Also in this embodiment, the space factor of the cushioning fillers 2 is set to be in a range of from 10 to 60%.

Figure 5:
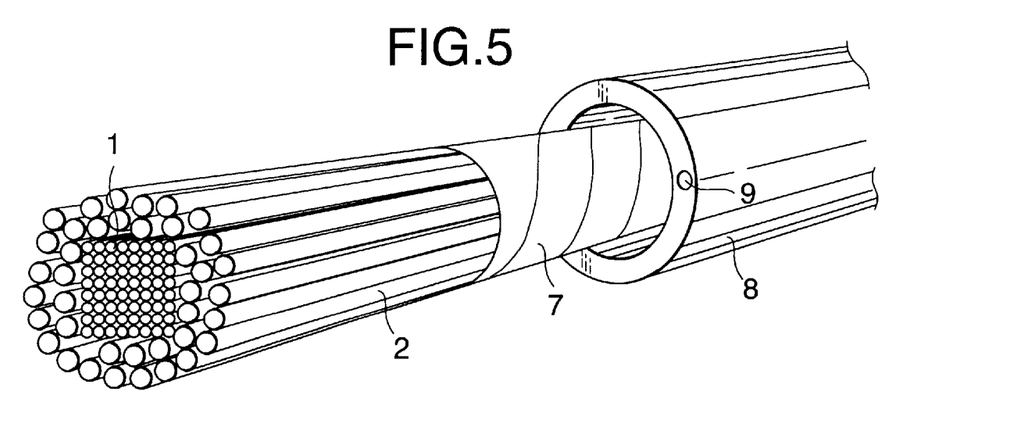
FIG. 5 is a sectional view showing an optical fiber cable as a fourth embodiment of the present invention.

FIG. 5 is a sectional view showing an optical fiber cable as a fourth embodiment of the present invention. In FIG. 5, parts the same as those in FIG. 1 are referenced correspondingly and the description of the parts will be omitted. In FIG. 5, the reference numeral 7 designates a pressure winding; 8, a tube; and 9, a tension member. In this embodiment, yarns or strings are used as the cushioning fillers 2 disposed around the optical fiber ribbon stack 1. The pressure winding 7 is applied onto the cushioning fillers 2. The optical fiber ribbon stack 1, the cushioning fillers 2 and the pressure winding 7 are accommodated in the sheath 8 which is the cylindrical member. The inner diameter of the sheath 8 is set to be larger than the outer diameter of the pressure winding 7 wound around the cushioning fillers 2 so that a gap is provided for securing the space factor. Incidentally, the pressure winding 7 may be wound around the cushioning fillers 2 loosely to make the space factor larger. The tube 8 is formed by extrusion molding of plastic material. The cushioning fillers 2 are disposed in the longitudinal direction of the optical fiber ribbon stack.

In a specific example, eight 8-fiber ribbons were stacked. Polypylen yarns were used as the cushioning fillers 2. A spanbounded nonwoven fabric having a thickness of 0.1 mm was used as the wrapping tape 7. The tube 8 was formed by extrusion molding of polyethylene so as to have an inner diameter of 4.8 mm and an outer diameter of 8.0 mm.

Figure 6:
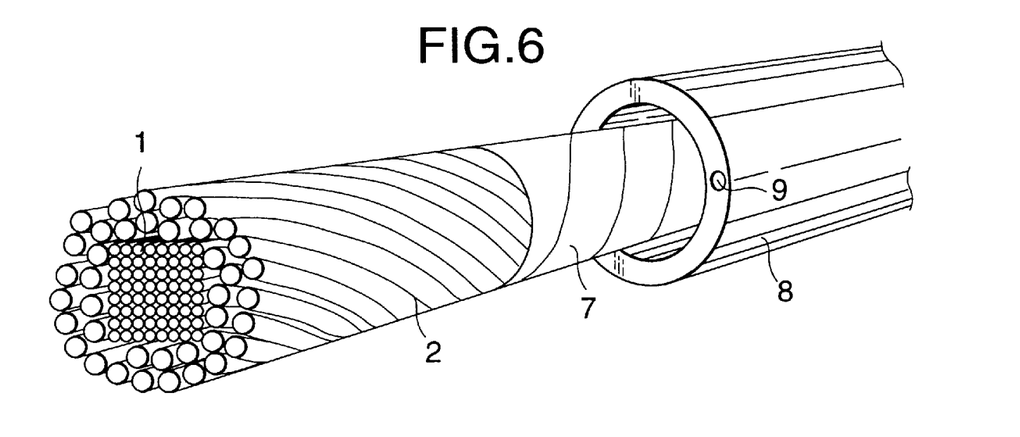
FIG. 6 is a sectional view showing an optical fiber cable as a fifth embodiment of the present invention.

FIG. 6 is a sectional view showing an optical fiber cable as a fifth embodiment of the present invention. In FIG. 6, parts the same as those in FIG. 5 are referenced correspondingly and the description of the parts will be omitted. In this embodiment, the cushioning fillers 2 are formed from the same material as used in the fourth embodiment but the cushioning fillers 2 are stranded unidirectionally around the optical fiber ribbon stack.

Figure 7:
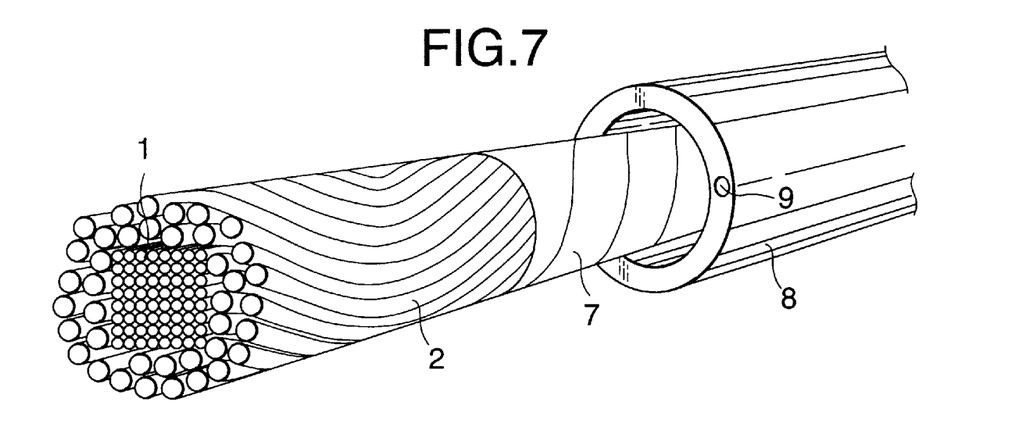
FIG. 7 is a sectional view showing an optical fiber cable as a sixth embodiment of the present invention.

FIG. 7 is a sectional view showing an optical fiber cable as a sixth embodiment of the present invention. In FIG. 7, parts the same as in FIG. 5 are referenced correspondingly and the description of the parts will be omitted. In this embodiment, the cushioning fillers 2 are formed from the same material as that used in the fourth embodiment but the cushioning fillers 2 are SZ-stranded around the optical fiber ribbon stack so that the direction of stranding is inverted alternately. In a specific example, the direction of stranding was inverted once per about 3 turns or about 4 turns.

In the experimental samples of the optical fiber cable in the fourth, fifth and sixth embodiments in which the space factor of the cushioning fillers was set to be 20%, both the initial transmission loss and low-temperature loss increasing characteristic at −40° C. were excellent.

The experimental samples of the optical fiber cable in the fourth, fifth and sixth embodiments were evaluated about the bending characteristic. When the optical fiber cable was bent with a small diameter of 100 mm, any change of transmission characteristic was not observed in the fifth and sixth embodiments but increase of loss by 0.06 dB was observed in the fourth embodiment. This is considered that, in the fifth and sixth embodiments, the cushioning fillers 2 were stranded so that increase of transmission loss due to side pressure was hardly generated because the optical fiber ribbon stack was prevented from projecting out of the cushioning fillers. Further, in the fifth embodiment, it was confirmed that, when the tube 8 and the pressure winding 7 were to be removed at a terminal, the cushioning fillers 2 never entered the gaps of the optical fiber ribbon stack 1 so that they could be removed easily. Thus, such excellent handling workability could be obtained in the fifth embodiment. Further, in the fourth and sixth embodiment, when the tube 8 and the wrapping tape 7 were to be removed at a terminal, the cushioning fillers 2 could be separated from the optical fiber ribbon stack 1 without being wound on the stack. Accordingly, in the fourth and sixth embodiment, excellent workability was obtained particularly when the long-scale optical fiber ribbon stack was to be removed at a terminal.

In a seventh embodiment, water-absorption yarn is used as the cushioning fillers 2 in the fifth embodiment. Like the fifth embodiment, both the initial transmission loss and low-temperature loss increasing characteristic at −40° C. were excellent. Further, when the cable having a length of 1 m was extended horizontally and one end portion of the cable was connected to a water-filling pipe with a water head length of 1 m for 24 hours, any running of water from the other end portion of the cable was not observed. Accordingly, the cable in the seventh embodiment has excellent characteristic as an optical fiber cable which is laid outdoors or buried under the ground which may be submerged.

Although the aforementioned embodiments have shown the case where optical fiber ribbon stack are stacked straight, the optical fiber ribbon stack may be stranded with a suitable pitch and the cushioning fillers may be disposed around the stranded optical fiber ribbon stack. When the standard optical fiber ribbon stack is stranded, excellent performance can be fulfilled both in transmission characteristic and in reliability because the lengths of respective optical fibers are made uniform in the case where the optical fiber cable is bent.

Further, as the cushioning fillers, it is possible to use not only polyester strings described above but also linear bodies having suitable elasticity and a suitable sectional area, such as polypropylene yarn, cotton fiber bundle, porous fibers, etc. Further, when a pressure winding is applied onto the outside of the cushioning fillers as shown in the fourth, fifth and sixth embodiments, the material for the pressure winding is not limited to nonwoven fabric but a string-like or tape-like material may be used as the material.

As the material for the cylindrical member, there can be used not only polyethylene but also polyester, Nylon, or another suitable plastic material. A metallic material such as stainless steel, aluminum, copper, etc. may be used as the material for the cylindrical member other than the plastic material. Further, the cylindrical member may be constituted by a plurality of layers which are formed from materials selected from the aforementioned materials. The terminology "cylindrical" in the cylindrical member means not only "geometrical cylindrical shape" but also any shape in which a portion for connection to a support wire is provided additionally to a cylindrical member as shown in the third embodiment so long as a substantially cylindrical space is formed in the inside of the member.

As is obvious from the above description, according to the present invention, an optical fiber ribbon stack and cushioning fillers disposed around the stack so as to have a space factor of from 10 to 50% are accommodated in a cylindrical space. Accordingly, an optical fiber cable excellent both in initial transmission loss and in loss increasing characteristic at a low temperature can be obtained. Particularly, the present invention is effective for application to an aerial optical fiber cable, an underground optical fiber cable, etc.

What is claimed is:

1. An optical fiber cable comprising:

a plurality of optical fiber ribbon successively stacked to form an optical fiber ribbon stack;

cushioning fillers made of stack of strings or yarns and disposed so as to surround said optical fiber ribbon stack; and an outer tube forming a cylindrical inner space so as to surround said cushioning fillers, wherein a space factor S of said cushioning fillers in a remaining space after removal of said optical fiber ribbon stack from said inner space of said outer tube is set to be in a range of 10% to 60% when the space factor S is given by the following expression:

$$S=\{B/(\pi r^2 - A)\} \times 100$$

in which A is a total sectional area of said optical fiber ribbon stack, r is the inner radius of said tube, and B is a total sectional area of the cushioning fillers and given by the following expression:

$$B=(\text{denier value} \times \text{total amount of the cushioning fillers})/(9000 \times \text{specific gravity of the cushioning fillers}).$$

2. An optical fiber cable according to claim 1, wherein the space factor of said cushioning fillers is set to be in a range of from 10 to 50%.

3. An optical fiber cable according to claim 1, wherein said cushioning fillers are provided so as to be stranded around said said optical fiber ribbon stack.

4. An optical fiber cable according to claim 3, wherein said cushioning fillers are provided so as to be stranded in one and inverted directions alternately around said optical fiber ribbon stack.

5. An optical fiber cable according to claim 1, wherein the number of optical fiber of each of said optical fiber ribbon stack is in a range of from 4 to 36 both inclusively.

6. An optical fiber cable according to claim 1, wherein the number of optical fiber of each of said optical fiber ribbon stack is in a range of from 4 to 12 both inclusively.

7. An optical fiber cable according to claim 1, wherein said outer tube is constituted by a plastic tube formed by extrusion molding.

8. An optical fiber cable according to claim 1, wherein said outer tube is constituted by a metallic tube.

9. An optical fiber cable according to claim 1, wherein said cushioning fillers have water absorption properties.

10. An optical fiber cable according to claim 1, wherein said space factor S is set to be in a range of from 20 to 40%.

11. An optical fiber cable according to claim 1, wherein said space factor S is set to be in a range of from 25 to 35%.

* * * * *